(12) United States Patent
Chiba et al.

(10) Patent No.: US 11,774,115 B2
(45) Date of Patent: Oct. 3, 2023

(54) AIR CONDITIONER AND METHOD OF MANUFACTURING PIPING

(71) Applicant: NEC Corporation, Tokyo (JP)

(72) Inventors: Masaki Chiba, Tokyo (JP); Kunihiko Ishihara, Tokyo (JP); Minoru Yoshikawa, Tokyo (JP); Junichi Miyamoto, Tokyo (JP); Yoshinori Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 36 days.

(21) Appl. No.: 17/400,667

(22) Filed: Aug. 12, 2021

(65) Prior Publication Data
US 2022/0049856 A1 Feb. 17, 2022

(30) Foreign Application Priority Data
Aug. 14, 2020 (JP) ................. 2020-136942

(51) Int. Cl.
*F24F 1/32* (2011.01)
*F24F 1/34* (2011.01)
*F16L 11/04* (2006.01)
*F16L 13/08* (2006.01)

(52) U.S. Cl.
CPC ............... *F24F 1/32* (2013.01); *F16L 11/04* (2013.01); *F16L 13/08* (2013.01); *F24F 1/34* (2013.01); *F16L 2011/047* (2013.01)

(58) Field of Classification Search
CPC ...... F16L 23/16; F16L 11/04; F16L 2011/047; F24F 1/34
See application file for complete search history.

(56) References Cited

U.S. PATENT DOCUMENTS

| 5,957,164 A | * | 9/1999 | Campbell | ............... B32B 27/34 138/140 |
| 7,857,010 B1 | * | 12/2010 | Davidson | ................ F16L 11/12 138/140 |
| 8,715,801 B2 | * | 5/2014 | Yamakawa | ............. B32B 25/18 428/35.9 |
| 10,670,172 B2 | * | 6/2020 | DiMascio | ............. F16L 11/085 |
| 11,073,232 B2 | * | 7/2021 | Rimal | ...................... B32B 27/20 |
| 2009/0193845 A1 | * | 8/2009 | Sugitani | ................ F04D 29/705 62/510 |
| 2011/0186170 A1 | * | 8/2011 | Oishi | ........................ F16L 9/14 138/140 |
| 2012/0021157 A1 | * | 1/2012 | Kawai | ................ B60H 1/00571 524/424 |
| 2015/0075666 A1 | * | 3/2015 | Clark | .................... F16L 11/085 138/137 |

FOREIGN PATENT DOCUMENTS

| JP | 2016-033348 A | 3/2016 |
| JP | 2017-031327 A | 2/2017 |

* cited by examiner

*Primary Examiner* — Lionel Nouketcha

(57) ABSTRACT

An air conditioner includes: a turbo compressor that compresses a heat medium; a heat exchanger that exchanges heat of the heat medium supplied from the turbo compressor with an atmosphere; and a supply flow path and a discharge flow path that connect the turbo compressor and the heat exchanger. At least one of the supply flow path and the discharge flow path includes piping, and the piping includes a gas barrier layer that covers a surface of a synthetic resin.

7 Claims, 6 Drawing Sheets

AIR CONDITIONER AND METHOD OF MANUFACTURING PIPING

This application is based upon and claims the benefit of priority from Japanese patent application No. 2020-136942, filed on Aug. 14, 2020, the disclosure of which is incorporated herein in its entirety by reference.

TECHNICAL FIELD

The present invention relates to an air conditioner and a method of manufacturing piping.

BACKGROUND ART

A server room for accommodating electronic devices such as a server is provided with an air conditioner (hereinbelow referred to as an air conditioner) that absorbs heat generated from the electronic devices to maintain the room temperature at an appropriate level.

A turbo compressor is disclosed in Patent Document 1 in relation to a technique for compressing a heat medium used in such an air conditioner.

Also, as a heat medium used in an air conditioner, compounds with low pressure specifications with low ozone depletion potential and global warming potential (GWP) tend to be adopted.

For example, one heat medium (JIS K 1560 R32) is considered to have a GWP value of 675, which is about one-third of the company's conventional heat medium (JIS K 1560 R410a).

Further, since a hydrofluoroolefin (HFO)-based low-pressure heat medium such as HFO1233zd has a GWP of less than 5, which is even lower than these heat media, has low toxicity, and is nonflammable, its use as a heat medium for air conditioners is desired.

In general, when a low-pressure heat medium (for example, a fluorine compound gas having a vapor pressure of 1 MPa or less when stored and transported in a normal environment) is used, since the amount of heat per unit volume that the heat medium can move is smaller than that of a high-pressure heat medium, a large amount of the heat medium needs to be moved, and so turbo compressors with a large discharge flow rate tend to be adopted.

Japanese Unexamined Patent Application, First Publication No. 2016-33348 (hereinafter referred to as "Patent Document 1") discloses a technique related to a compressor used for cooling a heat medium in an air conditioner.

The centrifugal turbo compressor described in Patent Document 1 employs a magnetic bearing as a bearing that supports the rotating shaft of the impeller, thereby reducing losses of the bearing due to the frictional resistance, enabling compression of a large flow rate of heat medium, and reducing maintenance and inspection costs associated with lubrication of bearings with grease.

SUMMARY

However, although the turbo compressor described in Patent Document 1 satisfies the performance required as a large flow rate compressor that transports a low-pressure heat medium, there was insufficient consideration to improving the performance of the refrigeration cycle and the entire heat pump constituting the air conditioner.

Specifically, since a large amount of low-pressure heat medium flows during the refrigeration cycle, when using conventional piping, it is necessary to increase the flow velocity in the piping compared to a general heat medium (which has less consideration for environmental load), or use large-diameter piping to reduce the flow velocity. Here, when the flow velocity of the heat medium is increased, problems arise such as increased pipeline resistance (and pressure loss of the heat medium accompanying this), which rises in proportion to the square of the flow velocity, and difficulty in exhibiting the expected cooling capacity depending on the compression capacity at the compression ratio planned for the turbo compressor.

Further, when the server room to be cooled and the compressor are far apart from each other and the pipeline is long, there is a problem that the pressure loss is further increased. In particular, in a turbo compressor where it is difficult to obtain a high compression ratio, it is desirable to reduce this pressure loss as much as possible.

In addition, in general air-conditioning equipment, small-diameter copper piping having a diameter of about 22 mm or less is used because of the demand for ease of processing and characteristics that make it difficult for gas to permeate, but when trying to distribute a low-pressure and large-flow heat medium, there is a problem that the pressure loss becomes large. Further, large-diameter copper piping has a problem of lacking the flexibility to meet the demand for free deformation when bent as compared with the above-mentioned small-diameter copper piping. In addition, as the thermal conductivity is good, it is necessary to cover the circumference of the piping with a heat insulating material and moreover cover this insulation with a sheath for protection, which leads to the problem of an increase in the number of man-hours required for installation. Although Japanese Unexamined Patent Application, First Publication No. 2017-31327 (hereinafter referred to as "Patent Document 2") discloses an oxygen permeation suppressing layer that suppresses the permeation of oxygen into a synthetic resin material, it does not indicate a usage mode related to piping of air conditioning equipment.

An example object of the present invention is to provide an air conditioner using a suitable piping material instead of copper piping and a method for manufacturing the piping used therein.

According to one example aspect of the present invention, an air conditioner includes: a turbo compressor that compresses a heat medium; a heat exchanger that exchanges heat of the heat medium supplied from the turbo compressor with an atmosphere; and a supply flow path and a discharge flow path that connect the turbo compressor and the heat exchanger. At least one of the supply flow path and the discharge flow path includes piping, and the piping includes a gas barrier layer that covers a surface of a synthetic resin.

According to another example aspect of the present invention, a method of manufacturing piping includes: removing a gas barrier layer of a pipe body from an end of the pipe body over a predetermined range, the gas barrier covering a surface of a synthetic resin; inserting, into a joint pipe, a portion of the pipe body where the gas barrier layer has been removed; and integrating the joint pipe with the pipe body by heating and melting the joint pipe.

EXAMPLE EMBODIMENT

The heat medium compression device according to a configuration example of a first example aspect of the present invention will be described with reference to FIG. 1.

Figure 1:
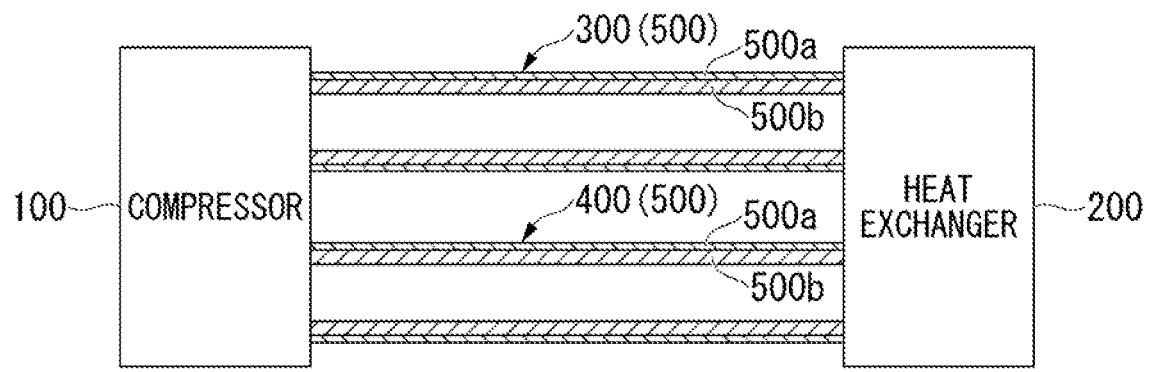
FIG. 1 is a block diagram of a configuration example of a heat medium compression device according to an example aspect of the present invention.

FIG. 1 shows a turbo compressor 100 that compresses a heat medium, and a heat exchanger 200 that exchanges heat of the heat medium supplied from the turbo compressor 100 with the atmosphere. An air conditioner has a discharge flow path 300 and a supply flow path 400 connected between the turbo compressor 100 and the heat exchanger 200.

A pipe body 500 constituting at least one of the discharge flow path 300 and the supply flow path 400 has a structure in which the surface of a synthetic resin is covered with a gas barrier layer 500a.

According to the above configuration, the pipe body 500 made of a synthetic resin is adopted as the discharge flow path 300 and the supply flow path 400 connecting the turbo compressor 100 and the heat exchanger 200. Since the thermal conductivity of the synthetic resin constituting the pipe body 500 is lower than that of the metal, it is possible to reduce the thermal conductivity between the heat medium and the atmosphere without providing a heat insulating material or the like on the surfaces of the discharge flow path 300 and the supply flow path 400. Further, since the gas barrier layer 500a is present on the surface of the pipe body 500, leakage of the heat medium can be prevented.

The method of manufacturing the piping according to a configuration example of a second example aspect of the present invention will be described with reference to FIGS. 1 and 2.

Figure 2:
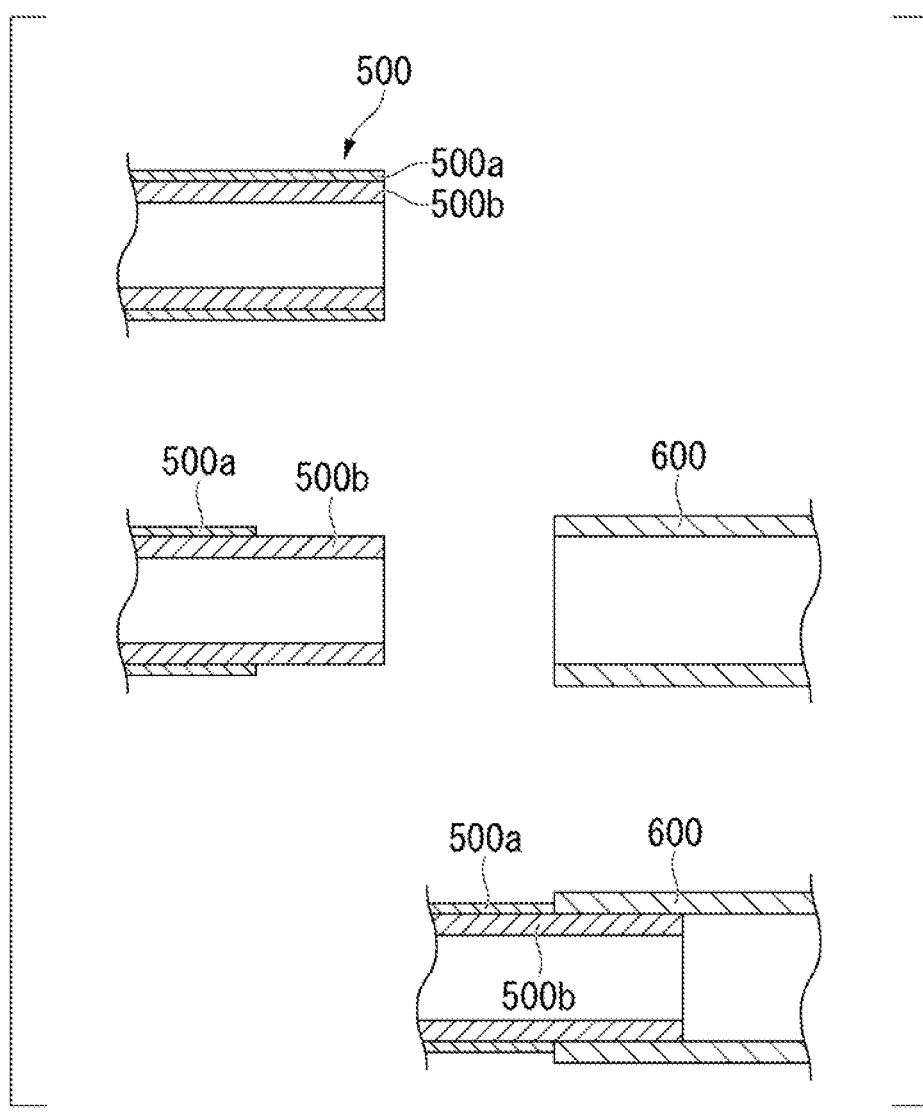
FIG. 2 is a process diagram of a configuration example of a method of manufacturing piping according to an example aspect of the present invention.

The method of manufacturing the piping that constitutes at least either of the discharge flow path 300 and the supply flow path 400 of an air conditioner device having the turbo compressor 100 that compresses a heat medium, the heat exchanger 200 that exchanges heat of the heat medium supplied from the turbo compressor 100 with the atmosphere, and the discharge flow path 300 and the supply flow path 400 connected therebetween has a step of first preparing the pipe body 500 in which the surface of a synthetic resin 500b is covered with a gas barrier layer 500a as shown in FIG. 2, and removing the gas barrier layer 500a from the end of the pipe body 500 over a predetermined length as shown in FIG. 2, a step of inserting the range from which the gas barrier layer 500a at the end of the pipe body 500 has been removed into the joint pipe 600 as shown in FIG. 2, and a step of integrating the joint pipe 600 with the synthetic resin 500b of the pipe body 500 by heating and melting the joint pipe 600.

By the above steps, the discharge flow path 300 and/or the supply flow path 400 can be manufactured by melting the synthetic resin 500b constituting the pipe body 500 to be integrated with the joint pipe 600.

The configuration according to a first example embodiment of the present invention embodying FIGS. 1 and 2 will be described with reference to FIGS. 3 to 10. In FIGS. 3 to 10, the same reference numerals are given to the configurations common to those in FIGS. 1 and 2, and the descriptions will be simplified.

Figure 3:
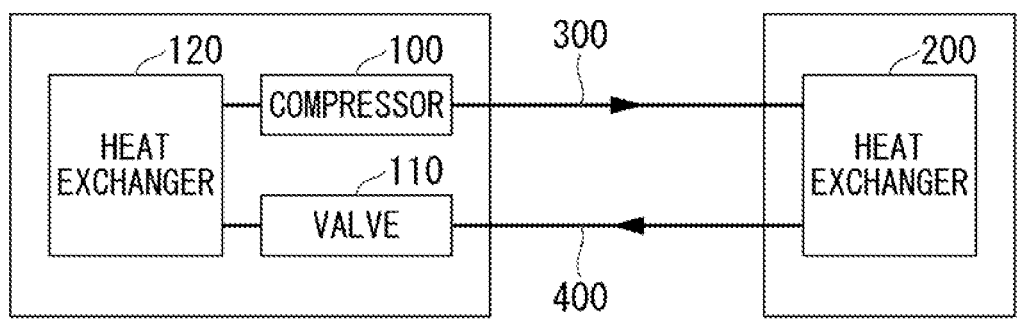
FIG. 3 is a block diagram of a heat medium compression device according to a first example embodiment of the present invention.

First, with reference to FIG. 3, an outline of the overall configuration of the air conditioner according to the first example embodiment will be described. The air conditioner according to the example embodiment of the present invention is used for air conditioning of a server room, and the heat medium compressed in the compressor 100 is supplied to the heat exchanger 200 as a condenser via the discharge flow path 300. The heat exchanger 200 condenses by cooling the heat medium compressed and discharged by the compressor 100. As the heat exchanger 200, for example, a system that dissipates heat by circulation of cooling water and heat dissipation using the heat of vaporization in a cooling tower, or alternatively a system that dissipates heat into the atmosphere with heat dissipation fins is adopted. As the heat medium, a low-pressure heat medium such as HFO (hydrofluoroolefin) or HCFO (hydrochlorofluoroolefin) is used.

The heat medium condensed by heat exchange in the heat exchanger 200 passes through the supply flow path 400 and undergoes flow velocity adjustment at an expansion valve 110 provided at a midway, thereby becoming a low-temperature liquid phase (or gas-liquid mixed phase state) to be supplied to a heat exchanger (heat receiver) 120. The heat exchanger 120 cools the air in the server room whose temperature has risen due to the exhaust heat of the server or the like by evaporation (pressure drop) of the heat medium. The compressor 100 sucks in and compresses the heat medium expanded by the heat exchange, and then circulates it to the heat exchanger 200 via the discharge flow path 300.

The structure of the piping constituting the discharge flow path 300 and the supply flow path 400 will be described with reference to FIGS. 4 and 5. The pipe body 500 has a structure in which the surface of the synthetic resin (synthetic resin layer) 500b is covered with the gas barrier layer 500a. The gas barrier layer 500a is made of a material that is less likely to allow gas to permeate than at least polyethylene, vinyl chloride, or the like that constitutes the synthetic resin layer 500b. For example, the gas barrier layer 500a is formed by applying a surface treatment technique such as thin film deposition or electroless plating using a metal such as aluminum, or a lamination (adhesion) technique using a metal foil. Further, the gas barrier layer 500a may be made of a synthetic resin material such as polyvinyl alcohol, which is less likely to allow gas to permeate than the constituent material of the pipe body (for example, polyethylene).

More specifically, the synthetic resin layer 500b of the illustrated example has a core layer 500c made of a synthetic resin reinforced by embedding glass fibers, and a protective layer 500d made of a synthetic resin with a smooth surface covering each of the inner circumference and the outer circumference of the core layer 500c. For the structure of the core layer 500c, it is desirable to change the composition of the synthetic resin material, the mixing ratio of the reinforcing glass fibers, the ratio of the pipe diameter to the wall thickness, and the like to optimum values according to the pressure resistance required for the piping.

The pipe bodies 500 are connected by a joint pipe 600 serving as a connecting portion.

The inner diameter of the joint pipe 600 is substantially equal to the outer diameter of the pipe body 500. Strictly speaking, the joint pipe 600 is made of a synthetic resin (for example, the same plastic material as the synthetic resin layer 500*b*) having a diameter slightly larger than the outer diameter of the synthetic resin layer 500*b* and an inner diameter allowing insertion of the synthetic resin layer 500*b*. The joint pipe 600 has a wall thickness sufficient to surround and reinforce the abutting portion of one pipe body 500 and another pipe body 500 adjacent thereto. Since the joint pipe 600 is shorter than the total length of the pipe body 500, gas leakage from the joint pipe 600 is minimal. Accordingly, it is not always necessary to provide the gas barrier layer on the joint pipe 600.

That is, at the end (end portion) of the pipe body 500, the synthetic resin layer 500*b* is exposed by removing the gas barrier layer 500*a* that covered the synthetic resin layer 500*b*. The exposed portion of the synthetic resin layer 500*b* is inserted into the joint pipe 600.

A heating element (shown by a broken line 601 in FIG. 4) that generates heat when energized is embedded in the joint pipe 600. The joint pipe 600 is provided with a connector 602 that projects outward and is electrically connected to the heating element 601. The heating element 601 is capable of being energized by a cable 603 through the connector 602.

Figure 4:
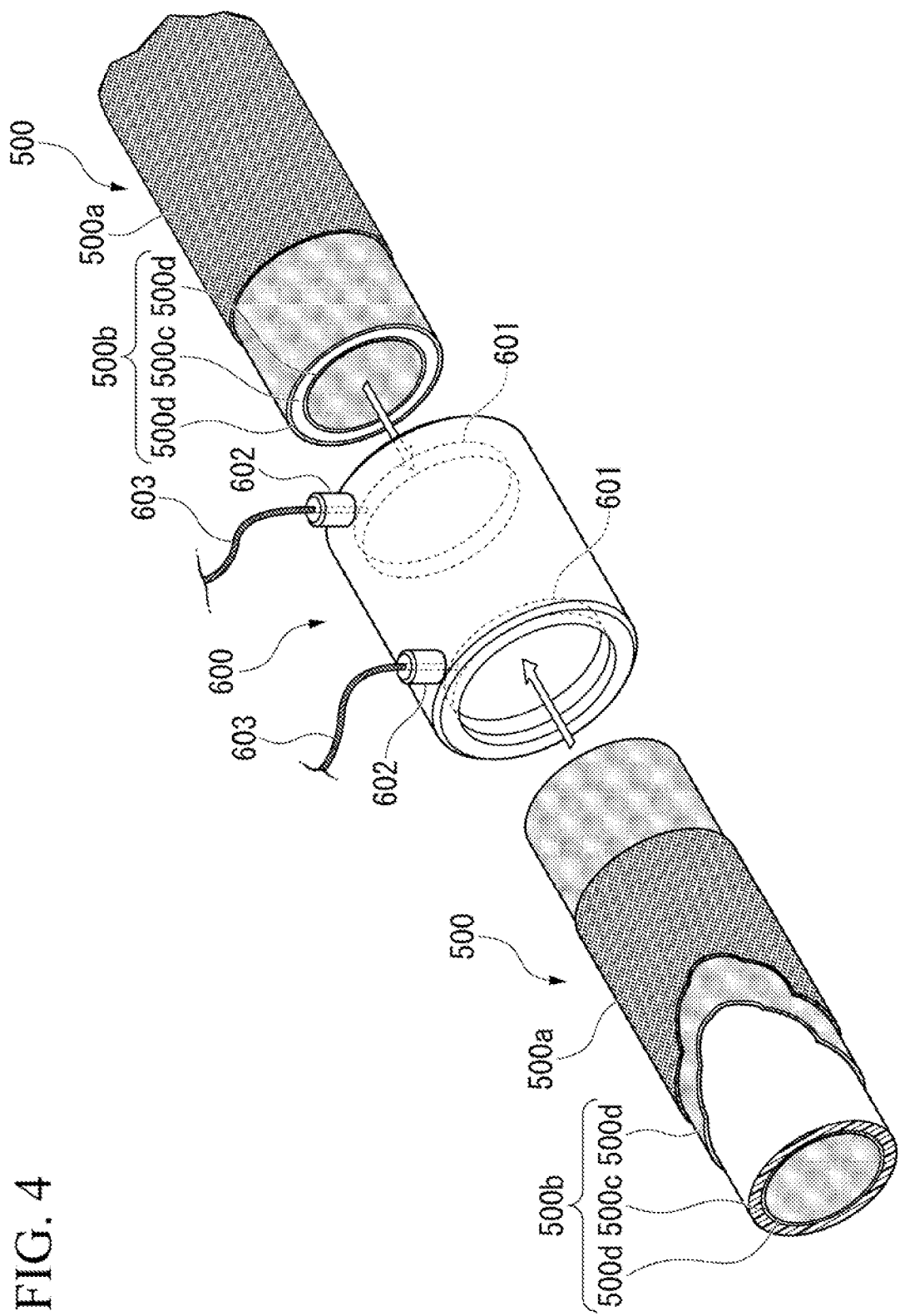
FIG. 4 is a perspective view showing a part of the piping of FIG. 3 as a cross section, and a cross-sectional view of main parts of FIG. 3.
Figure 5:
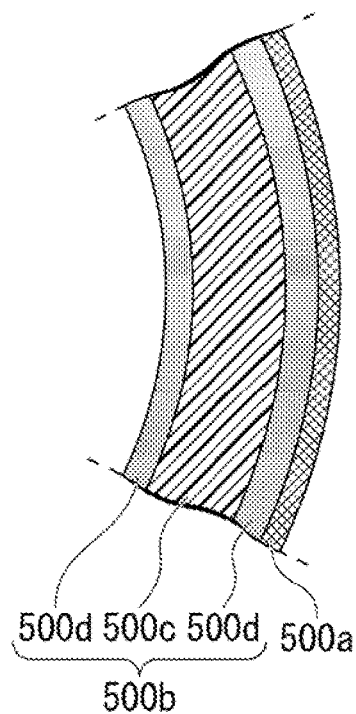
FIG. 5 is a cross-sectional view of a main parts of the piping of FIG. 4.

Moreover, the two pipe bodies 500 shown in FIG. 4 are inserted into the joint pipe 600 from both sides up to the range where the gas barrier layer 500*a* is removed and the synthetic resin layer 500*b* is exposed, to be integrated with the joint pipe 600 over the inserted range.

The process of connecting the two pipe bodies 500 with the joint pipe 600 to manufacture an integrated piping will be described.
(Step 1)
The gas barrier layer 500 in a predetermined range is removed from the end of each pipe body 500 to expose the synthetic resin layer 500*b* (specifically, the protective layer 500*d* on the surface thereof). The gas barrier layer 500 can be easily removed by machining such as grinding and cutting.
(Step 2)
Insert the pipe bodies 500 into the joint pipe 600.
(Step 3)
Each heating element 601 of the joint pipe 600 is energized via the respective cable 603 and connector 602 to generate heat.
(Step 4)
The heat generated from the heating element 601 melts the synthetic resin constituting the joint pipe 600 and the pipe body 500.
(Step 5)
When the energization of the heating element 601 is stopped and a predetermined time elapses, the synthetic resin is solidified by cooling, and the joint pipe 600 and the pipe bodies 500 on both sides are integrated. That is, the two pipe bodies 500 are integrally connected by the joint pipe 600.

After the connection is completed, the connectors 602 and the like protruding from the outside of the joint pipe 600 are removed as necessary.

Figure 8:
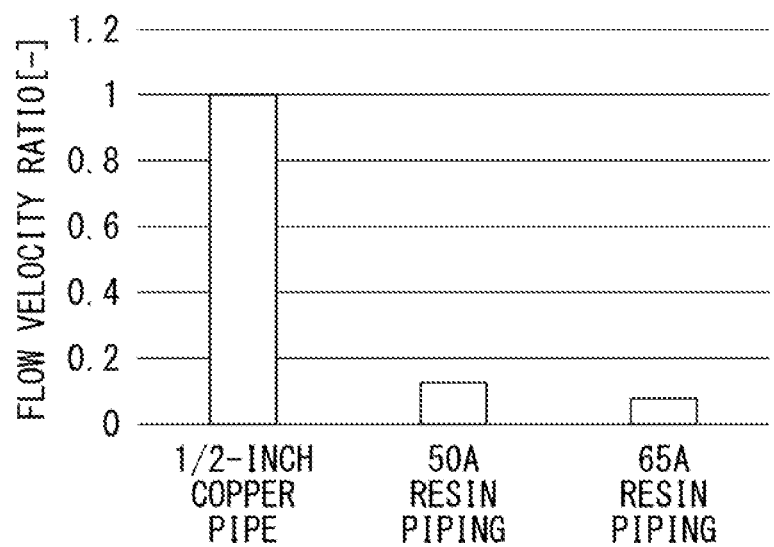
FIG. 8 is a chart showing an example of flow velocity ratios of refrigerant gas by pipe diameter.
Figure 9:
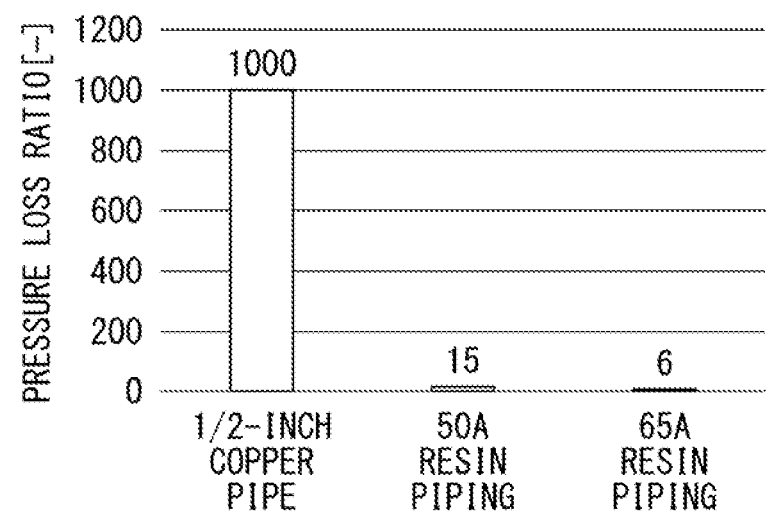
FIG. 9 is a chart showing an example of pressure loss ratios of refrigerant gas by pipe diameter.

As shown in FIG. 8, it is possible to reduce the flow velocity to ⅒ or less of the flow velocity of a copper pipe having a nominal diameter of ½ inch by for example adopting a pipe diameter such as nominal diameters 50A and 60A, which roughly represent numerical values in mm units of the inner diameter. That is, the pressure loss can be reduced by lowering the flow velocity in the discharge pipe and the supply pipe.

Figure 7:
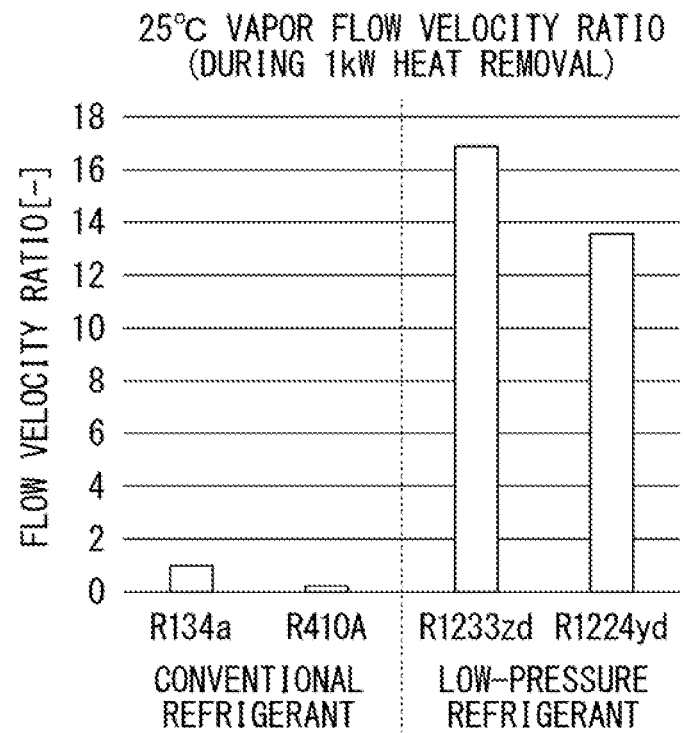
FIG. 7 is a chart showing an example of coolant gas flow velocity ratios between the high-pressure refrigerant and the low-pressure refrigerant.

FIG. 7 shows examples of the flow velocity in the piping system with a relatively high-pressure heat medium such as R134a and R410 of JIS K 1560 and a relatively low-pressure heat medium such as R1233zd and R1224yd of JIS K 1560 used in this example embodiment. As shown in FIG. 7, it is understood that a low-pressure heat medium requires a large flow rate to transfer the required energy.

The detailed configuration of the compressor 100 adopted in the first example embodiment will be described with reference to FIG. 6.

Figure 6:
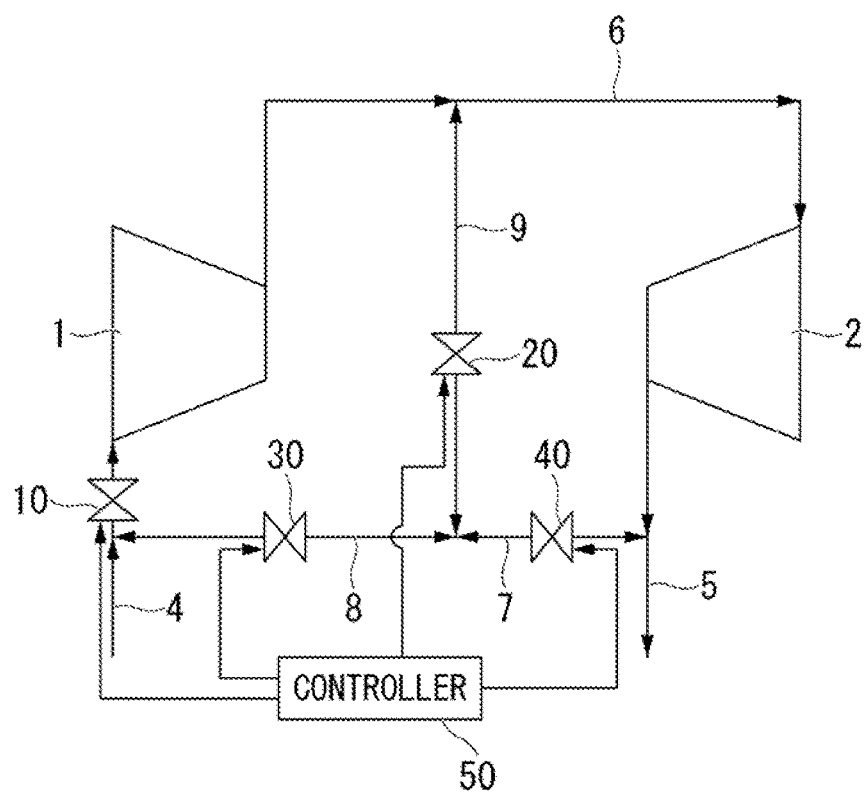
FIG. 6 is a piping system diagram of the first example embodiment.

FIG. 6 shows a first compressor 1 that compresses and discharges the sucked in heat medium. In this first example embodiment, a turbo compressor is adopted as the first compressor 1, for example. The turbo compressor has the compression ratio that is smaller than that of a positive displacement compressor, and has a large discharge flow rate (volumetric flow rate).

The first compressor 1 compresses the heat medium supplied from a suction side pipe 4 connected to the discharge side of the heat exchanger 120 at a predetermined compression ratio and discharges the heat medium to a connecting pipe 6, to be supplied to the suction side of the second compressor 2. In this first example embodiment, as the second compressor 2, a turbo compressor having the same specifications as the first compressor 1 (at least, the rated capacity according to the compression ratio and the volume capacity is the same) is adopted.

A (first) discharge side pipe 5 is connected to the discharge side of the second compressor 2. Further, a (second) discharge side pipe 7 is connected in parallel with the (first) discharge side pipe 5 to the discharge side of the second compressor 2, and further, a bypass pipe 8 and a return pipe 9 are connected.

The suction side pipe 4 is provided with a first valve 10 for adjusting the flow rate of the heat medium sucked into the first compressor 1. The return pipe 9 is provided with a second valve 20 for adjusting the flow rate of the heat medium flowing through the return pipe 9.

The bypass pipe 8 is provided with a third valve 30 for adjusting the flow rate of the heat medium flowing through the bypass pipe 8, and the second discharge side pipe 7 is provided with the fourth valve 40 for adjusting the flow rate of the heat medium flowing through the second discharge side pipe 7. The connection point between the second discharge side pipe 7 and the bypass pipe 8 is connected to the connecting pipe 6 via the return pipe 9. The same synthetic resin pipes as those in FIGS. 3 and 4 may be used for the pipes such as the discharge side pipe 5, the connecting pipe 6, the bypass pipe 8, and the return pipe 9. However, since the path of theses pipes is short, the pressure loss is also small. Therefore, in consideration of ease of installation or the balance between the construction cost and the energy loss due to pressure loss, a conventional copper pipe or a pipe material made of another metal may be used in whole or in part.

The first valve 10, the second valve 20, the third valve 30, and the fourth valve 40 are, for example, automatic values operated by an electric motor or air pressure, and are controlled to open, close or partially open by a controller 50, but some or all of the valves may be manually adjusted according to the operating condition of the air conditioner.

The heat medium compression device switches to the operation modes of the operation examples 1 to 4 described later to compress the heat medium by operation of the first valve 10, the second valve 20, the third valve 30, and the fourth valve 40. Table 1 shows the combinations of the opening/closing states of the first, second, third, and fourth valves 10, 20, 30, and 40 in these operation examples 1 to 4.

TABLE 1

|  | First Valve 10 | Second Valve 20 | Third Valve 30 | Fourth Valve 40 |
| --- | --- | --- | --- | --- |
| Operation Example 1 | Open | Adjusted | Closed | Adjusted |
| Operation Example 2 | Open | Open | Adjusted (Closed) | Open (Adjusted) |
| Operation Example 3 | Closed | Open | Open | Closed (Adjusted) |
| Operation Example 4 | Closed | Closed | Open | Open |

The outline of the operation examples 1 to 4 shown in Table 1 will be described.

Operation Example 1

In operation example 1 under a normal load state, a part of the heat medium compressed by the second compressor 2 is returned to the connecting pipe 6, whereby the suction amount of the second compressor 2 can be made larger than the discharge amount of the first compressor 1. Therefore, even when the second compressor 2 has a discharge capacity equivalent to that of the first compressor 1, it is possible to prevent surging due to an insufficient suction amount or a decrease in compression efficiency in a turbo compressor in which output adjustment is not easy. That is, by causing the second compressor 2 having the same compression ratio and discharge flow rate as the first compressor 1 to suck in the heat medium circulating through the return pipe 9 in addition to the heat medium smaller than the rated value discharged from the first compressor 1, the second compressor can be operated with an efficient rated suction amount and discharge amount. The flow rate of the heat medium circulating in the second compressor 2 can be adjusted by the opening degree of the second valve 20 and the fourth valve 40.

Operation Example 2

In operation example 2 when the load on the server is small and the amount of heat discharged into the server room is small, or the outside air temperature is low such as during autumn and winter and the heat load of the air conditioner is small, the first compressor 1 only is used. Thereby, the air conditioner can be operated with appropriate energy consumption according to the heat load. In the pipeline of FIG. 5, since the resistance of the pipeline that reaches the first discharge side pipe 5 via the first compressor 1 to the bypass pipe 8 to the second discharge side pipe 7 is less than the resistance of the pipeline reaching the first discharge side pipe 5 via the inside of the second compressor 2, the flow rate of the heat medium flowing through the second compressor 2 is small.

When a configuration is adopted in which the second compressor 2 can be separated from the heat medium pipeline by providing valves on the suction side and the discharge side of the second compressor 2 (not shown in FIG. 6) and closing these valves fully, even during the operation of the first compressor 1, the second compressor 2 can be separated from the heat medium pipeline for maintenance, inspection, or replacement with a spare compressor.

Operation Example 3

Similar to the above operation example 2, in operation example 3 when the load on the server is small and the amount of heat discharged into the server room is small, or the outside air temperature is low such as during autumn and winter and the heat load of the air conditioner is small, by operating only the second compressor 2, the air conditioner can be operated with appropriate energy consumption according to the heat load.

Note that in addition to the valve 10 on the suction side of the first compressor 1, a valve may be provided on the discharge side (upstream from the connection point where the return pipe 9 branches from the connecting pipe 6). By fully closing these valves, even during the operation of the second compressor 2, the first compressor 1 can be separated from the heat medium pipeline for maintenance, inspection, or replacement with a spare compressor.

Operation Example 4

In operation example 4 when the amount of heat generated from the server is extremely small, or the outside air temperature is low such as during autumn or winter and the heat addition of the air conditioner is extremely small, or moreover the server is not energized such as when shut down, the first valve 10 and the second valve 20 are fully closed, and the third valve 30 and the fourth valve 40 are fully open. Further, both the first compressor 1 and the second compressor 2 are stopped.

That is, in operation example 4, the heat medium circulates through the suction side pipe 4 to the second discharge side pipe 7 to the first discharge side pipe 5.

When a valve is provided on the discharge side of the second compressor 2, both the first compressor 1 and the second compressor 2 can be separated from the heat medium pipeline for maintenance, inspection, or replacement with a spare compressor.

According to the present example embodiment, efficient operation can be performed according to the load required for the air conditioner by the operation of the above operation examples 1 to 4.

FIGS. 7 to 10 compare, for example, the pressure value of the heat medium at the inlet of the compressor 1 (suction side pipe 4), the outlet of the compressor 2 (discharge side pipes 5 and 7), and the heat exchanger (condenser) 200 for the case of an about ½-inch copper pipe (indicated by a broken line in the graph (especially in FIG. 10)) and the case of the pipes of about 50A and 60A having a gas barrier layer of the first example embodiment (indicated by a solid line in the graph (especially in FIG. 10)). As shown in FIGS. 7 to 10, while the pressure loss from the outlet of the compressor 2 (discharge side pipes 5 and 7) to the heat exchanger (condenser) 200 in the pipes of about 50A and 60A having the gas barrier layer is, respectively, about 15 kPa and 6 kPa, the pressure loss in the ½-inch copper pipe is about 1000 kPa, which is much larger than that of a pipe having a gas barrier layer and a large inner diameter, and so the power required to drive the compressor 2 (power consumption of the drive motor and the like) increases.

Figure 10:
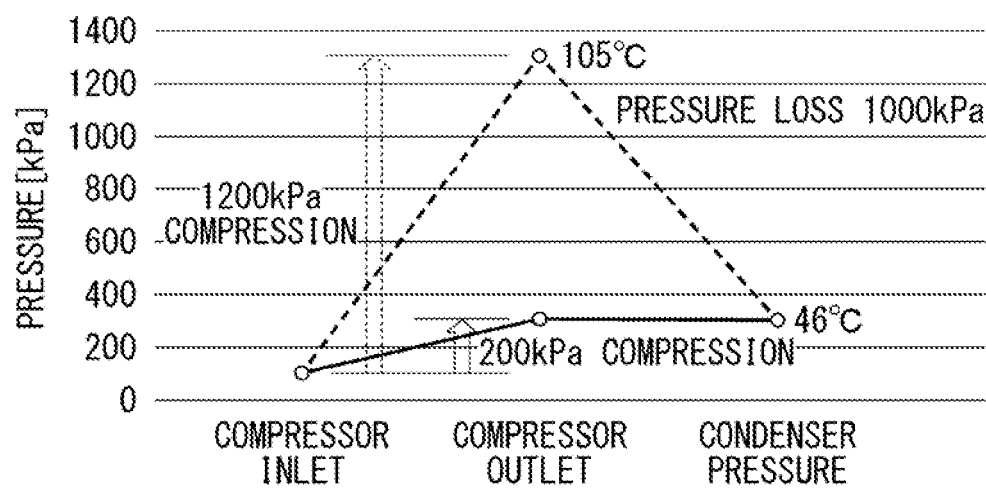
FIG. 10 is a chart showing an example of changes in pressure in each part of the pipeline before and after the compressor.

That is, in FIG. 10, by using a pipe having a gas barrier layer and a synthetic resin layer, it is possible to supply a heat medium having a required flow rate to the air conditioner under a condition where the pressure loss is small.

In addition, since the synthetic resin material that composes the pipe has extremely low thermal conductivity compared to a metal such as copper. Therefore, in the case of the pipe composed of the synthetic resin material, even if the coating with the heat insulating material, which is essential for copper pipes, is omitted, the heat transfer between the piping system and the atmosphere can be minimized, the cost of the heat medium piping can be reduced, and the expansion of space which is required for piping due to the increase in pipe diameter can be minimized by omitting the heat insulating material required for copper pipes and the sheath that covers it. In addition, the man-hours required for the construction of the heat insulating material and the sheath can be reduced.

The synthetic resin material constituting the pipe body, and the organic material and/or the inorganic material forming the gas barrier layer are not limited to the above example embodiments.

Moreover, the heating when connecting the synthetic resin pipe is not limited to the method of energizing the heating elements built in the connecting pipe in the example embodiment. For example, a method of integrally melting by heating by other means such as hot air or infrared rays, or a method of mechanically bonding using a flange, a sleeve, or the like may be used.

Further, the piping having the gas barrier layer and the synthetic resin layer according to the example embodiment of the present invention is not limited to the piping between the compressor and the heat exchanger shown above, and can also be used in place of a metal pipe such as a copper pipe for any of the pipes constituting the flow path through which the heat medium in the gas-liquid phase or the gas-liquid mixed phase flows.

According to an example embodiment of the present invention, it is possible to provide an air conditioner using a low-pressure heat medium and a method of manufacturing piping.

While preferred example embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The present invention may be used for a heat medium compression device, an air conditioner, and piping through which a heat medium or the like flows.

What is claimed is:

1. An air conditioner comprising:
a turbo compressor that compresses a heat medium;
a heat exchanger that exchanges heat of the heat medium supplied from the turbo compressor with an atmosphere; and
a supply flow path and a discharge flow path that connect the turbo compressor and the heat exchanger,
wherein at least one of the supply flow path and the discharge flow path comprises piping, and the piping comprises:
a gas barrier layer that covers a surface of a synthetic resin;
a plurality of pipe bodies comprising a first pipe body and a second pipe body that are adjacent to each other; and
a connecting portion that connects the first pipe body and the second pipe body to each other, the connecting portion being integrally fused with the synthetic resin that constitutes the first pipe body and the synthetic resin that constitutes the second pipe body.

2. The air conditioner according to claim 1, wherein the piping connects the turbo compressor and a condenser that condenses the heat medium compressed by the turbo compressor.

3. The air conditioner according to claim 1, wherein the piping connects another heat exchanger that evaporates the heat medium and the turbo compressor that compresses the heat medium evaporated by said another heat exchanger.

4. The air conditioner according to claim 1,
wherein the turbo compressor comprises a first compressor and a second compressor connected in series by a connecting pipe, and
the air conditioner further comprises a controller that controls a flow rate of the heat medium flowing through the first compressor and the second compressor,
the controller selectively connects the first compressor and the second compressor between the supply flow path and the discharge flow path, or connects the first compressor and the second compressor in series between the supply flow path and the discharge flow path, and performs control such that the flow rate of the heat medium sucked into the second compressor is larger than the flow rate of the heat medium discharged from the first compressor.

5. An air conditioner comprising:
a turbo compressor that compresses a heat medium;
a heat exchanger that exchanges heat of the heat medium supplied from the turbo compressor with an atmosphere; and
a supply flow path and a discharge flow path that connect the turbo compressor and the heat exchanger,
wherein at least one of the supply flow path and the discharge flow path comprises piping, and the piping comprises:
a gas barrier layer that covers a surface of a synthetic resin;
a plurality of pipe bodies comprising a first pipe body and a second pipe body that are adjacent to each other; and
a connecting portion that connects the first pipe body and the second pipe body to each other,
the connecting portion has a tubular shape, and the first pipe body and the second pipe body are inserted into the connecting portion, and
the gas barrier layer is removed from the first pipe body and the second pipe body by a range where the first pipe body and the second pipe body are inserted into the connecting portion.

6. The air conditioner according to claim 5, wherein an inner surface of the connecting portion is integrally fused with an outer surface of the first pipe body and an outer surface of the second pipe body.

7. An air conditioner comprising:
a turbo compressor that compresses a heat medium;
a heat exchanger that exchanges heat of the heat medium supplied from the turbo compressor with an atmosphere;
a supply flow path and a discharge flow path that connect the turbo compressor and the heat exchanger;

a controller; and a return pipe, wherein at least one of the supply flow path and the discharge flow path comprises piping, and the piping comprises a gas barrier layer that covers a surface of a synthetic resin, the turbo compressor comprises a first compressor and a second compressor connected in series by a connecting pipe, the controller controls a flow rate of the heat medium flowing through the first compressor and the second compressor, the controller selectively connects the first compressor and the second compressor between the supply flow path and the discharge flow path, or connects the first compressor and the second compressor in series between the supply flow path and the discharge flow path, and performs control such that the flow rate of the heat medium sucked into the second compressor is larger than the flow rate of the heat medium discharged from the first compressor, the return pipe connects a discharge side of the second compressor and a suction side of the second compressor, and the controller further controls a flow rate of a heat medium flowing through the return pipe.

* * * * *